April 26, 1966  E. A. HOUSER ETAL  3,247,702
METHOD OF CALIBRATING GAS ANALYZERS
Filed Feb. 21, 1964
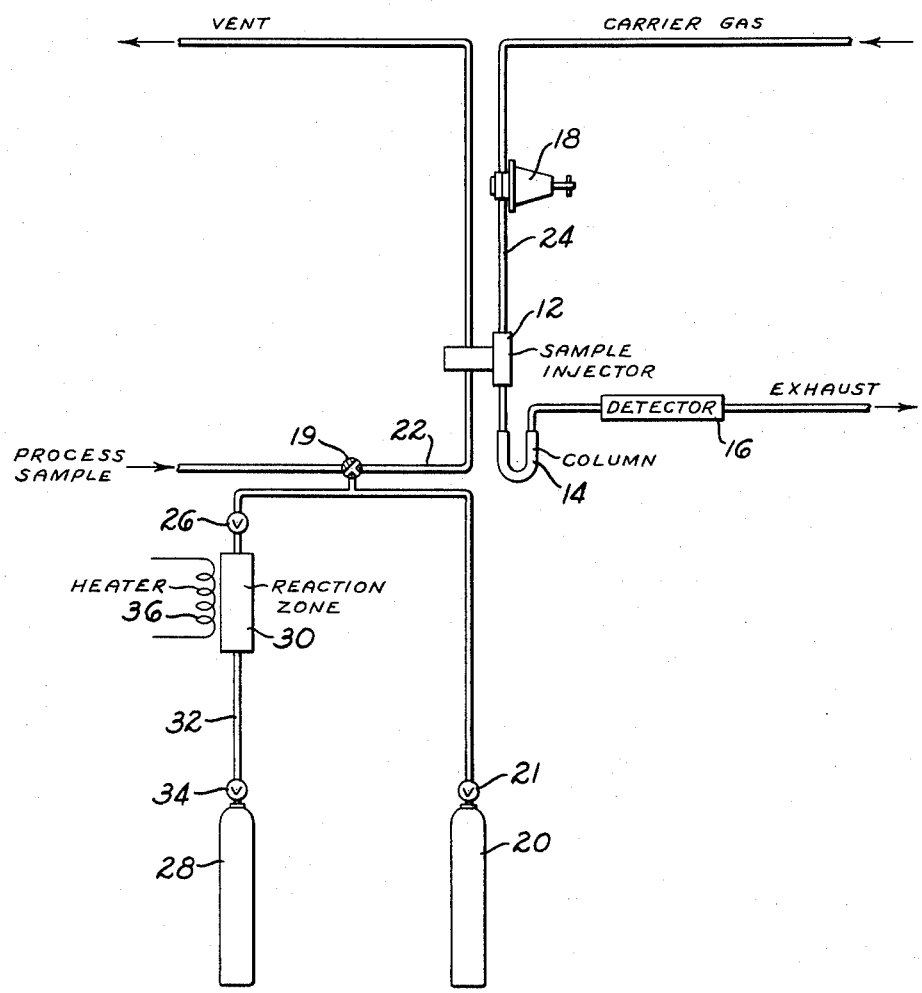
INVENTORS.
EDWIN A. HOUSER
GEORGE S. TURNER
PAUL A. HERSCH
BY THEIR ATTORNEYS.
HARRIS, KIECH, RUSSELL & KERN

United States Patent Office 3,247,702
Patented Apr. 26, 1966

3,247,702
METHOD OF CALIBRATING GAS ANALYZERS
Edwin A. Houser, George S. Turner, and Paul A. Hersch, Fullerton, Calif., assignors to Beckman Instruments, Inc., a corporation of California
Filed Feb. 21, 1964, Ser. No. 346,479
15 Claims. (Cl. 73—1)

This invention relates to calibration of gas analyzers and, more particularly, to a method of calibrating a gas analyzer for the analysis of a storage unstable or other material.

In the calibrating of a process analyzer such as a gas chromatograph or an electrolytic hygrometer, it is often a tedious task, frequently involving complex equipment, to establish with the required accuracy the concentration of a storage unstable material in a calibrating gas mixture. Calibrating gas mixtures containing water vapor and held in storage cannot be relied upon to have a constant and unvarying concentration of water. For this reason, whenever a process analyzer is being calibrated for water vapor or other storage unstable materials, the calibrating gas mixture is accurately checked for its current water vapor concentration before use.

It is a principal object of this invention to provide an improved method for calibrating gas analyzers and in particular for calibrating the gas analyzer for the analysis of a storage unstable material.

It is a still further object of the invention to provide an improved process for calibrating various gas analyzers for the analysis of water vapor.

It is another object of the invention to provide a calibration procedure especially suitable for a gas chromatograph for the analysis of water vapor and other storage unstable materials.

The calibration method of the invention involves providing reactants for the synthesis of the storage unstable material with one of the reactants, and preferably all, being stable and with at least one reactant present in a known concentration and the other reactant (which is usually a single material but may be more than one) being present in at least a stoichiometric amount. The reactants are reacted to obtain a substantially complete conversion of the reactant of known concentration in the synthesis of the unstable material. Thereafter, the synthesized unstable material is delivered to the gas analyzer for use in the calibration of the instrument. Usually there will be provided a separate and distinct reaction zone having conditions required for the synthesis of the unstable material. The gas mixture containing the reactants is introduced to the zone and there the reactants are reacted in the synthesis of the unstable material. It will be apparent that the second reactant must be present in at least a stoichiometric amount for reaction with the first reactant of known concentration and preferably the second reactant will be present in considerably more than a stoichiometric amount. An excess of the second reactant will tend to assure complete conversion of the first reactant of known concentration. The gas mixture containing the synthesized material is removed from the reaction zone and passed to the gas analyzer for use in calibration.

It will be appreciated that the conditions maintained in the reaction zone for the synthesis will depend upon the particular material being synthesized. In most instances, it will be necessary to provide a catalyst and maintain the temperature of the zone within favorable range.

In the synthesis of water vapor, hydrogen is preferably provided in a known concentration with the oxygen being supplied in greater than a stoichiometric amount. The two materials are contained in a dry gas mixtures made up principally of an inert gas, for example, nitrogen, with the hydrogen being usually supplied in a minor amount, e.g., up to two percent by volume and with an excess of the oxygen over that required to complete the combustion of the hydrogen. The gas mixture is conveniently supplied in a pressure cylinder and is removed therefrom in a metered stream to the reaction zone which in the instance of water synthesis will contain preferably a platinum catalyst of silica wool or other suitable substrate. Rhodium catalyst may also be used. The reaction zone is desirably maintained at a temperature in the range of 80° to 200° C. and preferably at about 90° C. Essentially complete conversion of hydrogen to water will occur in the reaction zone, so long as there is adequate oxygen in the prepared gas mixture. Since the hydrogen is present in a known concentration and is fully coverted to water, the concentration of water synthesized is known. Hydrogen-oxygen mixtures may be stored for long periods of time and will maintain their known compositions. In contrast, water vapor containing gas mixtures can not.

The foregoing objects and advantages of the invention, together with various other objects and advantages will become evident to those skilled in the art in light of the following disclosure and drawing. The drawing shows and the description following describes an embodiment of the process wherein a gas chromotagraph is the gas analyzer being calibrated.

The single figure of the drawing is a flow diagram illustrating a system for the calibration of a gas chromatograph for water vapor analysis.

In the drawing there is illustrated a typical arrangement of a gas chromatograph including a sample injector 12, a chromatograph column 14 and a detector 16, all connected in series. The flow of the carrier gas, which may be, for example, argon, helium or nitrogen, is controlled by a pressure regulator 18. At intervals, a quantity of sample is injected into the carrier gas at the sample injector 12 and components of the sample are separated as the sample moves through the column 14. The detector 16 provides an output indicating the presence of a sample component in the column effluent; the output may be used as a quantitative measure of the component. The detector output is ordinarily recorded in some form for subsequent review, although the output may be merely indicated for contemporaneous visual inspection.

The gas chromatograph, as other gas analyzers, must be from time to time calibrated in order to determine or detect errors that may be present in analysis of the various components of the process stream being analyzed. In the calibration of storage stable materials such as methane and the like, it is only necessary to prepare or provide a calibrating gas mixture having a known and precise concentration of the methane or other component to be calibrated. However, in the instance of storage unstable materials such as water vapor, it is necessary with each calibration for the particular unstable component to determine accurately the water vapor concentration in the calibrating gas mixture and this, as explained before, is a tedious procedure and frequently requires complex equipment.

Calibration of the gas chromatograph illustrated, which includes the sample injector 12, the column 14 and the detector 16, in the instance of a stable material such as methane may be easily accomplished by providing a pressure cylinder 20 containing a known amount of the methane. A three-way control valve 19 is open to direct flow from the pressure cylinder 20 through an open flow control needle valve 21 into a sample line 22 which leads to the sample injector 12. The sample injector is employed to inject a small amount of the calibrating gas into a carrier gas line 24 to the column 14. The gas mixture from the pressure cylinder 20 passing beyond the sample injector 12 is vented. During the calibration using the gas mixture from pressure cylinder 20, a pressure shut-off valve 26 is closed.

The system for calibration of the gas chromatograph for the analysis of water includes a pressure cylinder 28 containing small concentrations of hydrogen and oxygen in a larger amount of an inert gas such as nitrogen. The hydrogen is present in a known amount and the oxygen in more than a stoichiometric amount, preferably about three times the stoichiometric amount. The pressure cylinder 28 is connected to a reaction zone 30 through a line 32 and a flow control needle valve 34. From the reaction zone the gas mixture flows through the shut-off valve 26 and three-way valve 19 into the sample line 22. When the gas chromatograph is being calibrated for water, the needle control valve 21 regulating the flow from the first pressure cylinder 20 is closed.

The reaction zone 30 contains a platinum catalyst supported on a silica wool substrate with a platinum comprising 3% by weight of the silica wool. The reaction zone 30 is provided with a heating means 36 which is desirably an electric heater to supply the heat needed to initiate the reaction between the oxygen and hydrogen. The reaction zone 30 is desirably maintained at a temperature in excess of 80° C. and preferably within the range of 80° to 200° C. At 90° C. about five minutes or less are required to obtain a constant water concentration and hydrogen-free effluent from the reaction zone 30, thus providing a suitable stream for calibration of the chromatograph. The synthesis of water is an exothermic reaction once initiated and if the synthesized water concentration is to be appreciably above 2% in the effluent stream from the reaction zone 30, suitable means for dissipating heat from the zone 30 should be supplied in order to maintain the reaction zone 30 within the preferred temperature range.

The particular system illustrated in the drawing is suitable for the calibration of other gas analyzers such as the electrolytic hygrometer.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim:

1. In a method of calibrating a gas analyzer for the analysis of a material, the steps comprising:
    providing reactants from a stored gas mixture for the synthesis of said material with one of said reactants being present in a known concentration and the other reactant being present in at least a stoichiometric amount;
    reacting said reactants to obtain a substantially complete conversion of said one reactant to said material; and
    delivering the synthesized said material to the gas analyzer.

2. In a method of calibrating a gas analyzer for the analysis of a storage unstable material, said method comprising:
    providing reactants from a stored gas mixture for the synthesis of the storage unstable material with at least one of said reactants being stable and present in a known concentration and the other reactant being present in at least a stoichiometric amount;
    reacting said reactants to obtain a substantially complete conversion of said one reactant to the storage unstable material; and
    delivering the synthesized storage unstable material to the gas analyzer for use in the calibration of said analyzer.

3. In a method of calibrating a gas analyzer for the analysis of a storage unstable material, the steps comprising:
    providing stable reactants from a stored gas mixture for the synthesis of the storage unstable material with one of said reactants being present in a known concentration and another reactant being present in more than a stoichiometric amount;
    removing a portion of the gas mixture and passing it to a reaction zone having conditions required for the synthesis of the unstable material and there reacting said reactants to obtain a substantially complete conversion of said one reactant in the synthesis of the unstable material; and
    removing gas containing the synthesized unstable material from the reaction zone and passing said gas to the analyzer for use in the calibration of said analyzer.

4. In a method of calibrating a gas analyzer for the analysis of water, the steps comprising:
    providing from storage a gas mixture containing hydrogen and oxygen with one of said hydrogen and oxygen materials being present in a known concentration and the other one of said hydrogen and oxygen materials being present in at least a stoichiometric amount;
    providing in a reaction zone conditions required for the reaction of hydrogen and oxygen and introducing to the zone a portion of the gas mixture and there obtaining a synthesis of water; and
    delivering the gas mixture containing the synthesized water from the reaction zone to the gas analyzer for use in the calibration of said analyzer.

5. In a method of calibrating a gas analyzer for the analysis of water, the steps comprising:
    providing from storage a gas mixture containing hydrogen and oxygen with one of the hydrogen and oxygen being present in a known concentration and the other one of said hydrogen and oxygen being present in more than a stoichiometric amount;
    providing a water synthesis reaction zone, said zone containing a catalyst and having a favorable temperature for the reaction of hydrogen and oxygen to produce water;
    delivering to said reaction zone a portion of the foregoing gas mixture and reacting hydrogen and oxygen to produce water; and
    delivering the gas mixture containing the synthesized water from the reaction zone to the gas analyzer.

6. A method of calibrating a gas analyzer for the analysis of water, the steps comprising:
    providing a gas mixture from storage containing hydrogen and oxygen at an elevated pressure with one of said hydrogen and oxygen being present in a known concentration and the other one of said hydrogen and oxygen being present in at least a stoichiometric amount;
    providing a reaction zone for the synthesis of water, said zone containing a platinum catalyst and having a favorable temperature for the reaction of hydrogen and oxygen to produce water;
    delivering a portion of the gas mixture to said reaction zone and there reacting the hydrogen and oxygen to produce water; and
    removing the gas mixture containing the synthesized water from the reaction zone and passing it to the gas analyzer for use in the calibration of said analyzer.

7. In a method of calibrating a gas analyzer for the analysis of water, the steps comprising:
    providing from storage as gas mixture containing hydrogen and oxygen at an elevated pressure with the hydrogen being present in a known amount and with the oxygen being present in more than a stoichiometric amount;
    providing a reaction zone for the synthesis of water, said zone comprising a platinum catalyst and having a favorable temperature for the reaction of hydrogen and oxygen to produce water;
    delivering a portion of the gas mixture to said reaction zone and causing the hydrogen and oxygen to react to produce water; and removing the gas mixture containing the synthesized water from the reaction zone and passing it to the gas analyzer for use in the calibration of said analyzer.

8. In a method of calibrating a gas chromatograph for the analysis of water, the steps comprising:

providing a gas mixture from storage containing hydrogen and oxygen at an elevated pressure with the hydrogen being present in a known concentration and the oxygen being present in more than a stoichiometric amount;

providing a reaction zone for the synthesis of water, said zone containing a platinum catalyst and having a favorable temperature for the reaction of hydrogen and oxygen to produce water;

delivering a portion of the gas mixture to said reaction zone and reacting the hydrogen and oxygen to produce water; and removing the gas mixture containing the synthesized water from the reaction zone and passing it to the gas chromatograph for use in the calibration of said chromatograph.

9. In a method of calibrating a gas chromatograph for the analysis of a storage unstable material, the steps comprising:

providing from storage in a gas mixture stable reactants for the synthesis of the unstable material with one of said reactants being present in a known concentration and the other reactant being present in more than a stoichiometric amount;

providing conditions for the reaction of said reactants and exposing a portion of the gas mixture to said conditions to obtain a substantially complete conversion of said one reactant in the synthesis of the unstable material; and delivering the synthesized unstable material in the gas mixture to the gas chromatograph for use in the calibration of said chromatograph.

10. In a method of calibrating a gas chromatographer for the analysis of a storage unstable material, the steps comprising:

providing a storage container of a gas mixture held at an elevated pressure, said gas containing stable reactants for the synthesis of the unstable material with one of said reactants being present in a known concentration and the other reactant being present in more than a stoichiometric amount;

removing gas from the pressurized storage container and passing it to a reaction zone and there reacting said reactants to obtain a substantially complete conversion of said one reactant in the synthesis of the unstable material; and passing gas containing the synthesized unstable material from the reaction zone to the gas chromatograph for use in calibration of said chromatograph.

11. In a method of calibrating a gas chromatograph for the analysis of water, the steps comprising:

providing a stored gas mixture containing hydrogen and oxygen with one of said hydrogen and oxygen being present in a known concentration and the other one of said hydrogen and oxygen being present in at least a stoichiometric amount;

providing in a reaction zone conditions required for the reaction of hydrogen and oxygen and introducing to the zone a portion of the gas mixture and there obtaining a synthesis of water; and delivering the gas mixture containing the synthesized water from the reaction zone to the gas chromatograph for use in calibration of said chromatograph.

12. In a method of calibrating a gas chromatograph for the analysis of a storage unstable material, the steps comprising:

providing from storage a gas mixture at an elevated pressure, said gas mixture containing reactants for the synthesis of the unstable material with one of said reactants being stable and being present in a known concentration and the other reactant being present in more than a stoichiometric amount;

removing a portion of the gas mixture and passing it to a reaction zone having conditions required for the synthesis of the unstable material and there reacting said reactants to obtain a substantially complete conversion of said one reactant in the synthesis of the unstable material; and removing gas containing the synthesized unstable material from the reaction zone and passing said gas to the chromatograph for use in the calibration of said chromatograph.

13. In a method of calibrating a gas chromatograph for analysis of water, the steps comprising:

providing a stored gas mixture containing hydrogen and oxygen with one of said hydrogen and oxygen being present in a known concentration and the other material being present in at least a stoichiometric amount;

delivering said gas mixture to a reaction zone having conditions for the synthesis of water and there reacting the hydrogen and oxygen to obtain a substantially complete conversion of said one of said reactants in the synthesis of water; and passing the gas mixture containing the synthesized water from the reaction zone to the gas chromatograph for use in the calibration of said chromatograph.

14. In a method of calibrating a gas chromatograph for the analysis of water, the steps comprising:

providing a gas mixture from storage containing hydrogen and oxygen with one of the hydrogen and oxygen being present in a known concentration and the other one of said hydrogen and oxygen materials being present in more than a stoichiometric amount;

providing a water synthesis reaction zone, said zone containing a catalyst and having a favorable temperature for the reaction of hydrogen and oxygen to produce water;

delivering to said reaction zone a portion of the foregoing gas mixture and reacting the hydrogen and oxygen to produce water; and delivering the gas mixture containing the synthesized water from the reaction zone to the gas chromatograph.

15. In a method of calibrating a gas chromatograph for the analysis of water, the steps comprising:

providing a gas mixture from storage containing hydrogen and oxygen at an elevated pressure with one of said hydrogen and oxygen being present in a known concentration and the other one of said hydrogen and oxygen being present at least in a stoichiometric amount;

providing a reaction zone for the synthesis of water, said zone containing a platinum catalyst and having a favorable temperature for the reaction of hydrogen and oxygen to produce water;

delivering a portion of the gas mixture to said reaction zone and causing the hydrogen and oxygen to react to produce water; and removing the gas mixture containing the synthesized water from the reaction zone and passing it to the gas chromatograph for use in the calibration of said chromatograph.

References Cited by the Examiner

UNITED STATES PATENTS 2,981,091 4/1961 Roberts _____ 73—1
3,096,157 7/1963 Brown et al.

LOUIS R. PRINCE, *Primary Examiner.*